United States Patent
Jin et al.

(10) Patent No.: US 10,693,170 B2
(45) Date of Patent: Jun. 23, 2020

(54) LITHIUM AIR BATTERY HAVING MULTI-LAYERED ELECTROLYTE MEMBRANE AND MANUFACTURING METHOD THEREOF

(71) Applicants: Hyundai Motor Company, Seoul (KR); IUCF-HYU (Industry-University Cooperation Foundation Hanyang University), Seoul (KR)

(72) Inventors: Dae Gun Jin, Gyeonggi-do (KR); Kyoung Han Ryu, Gyeonggi-do (KR); Won Keun Kim, Gyeonggi-do (KR); Dong Won Kim, Seoul (KR); Jae Hong Kim, Seoul (KR); Hyun Sik Woo, Seoul (KR)

(73) Assignees: Hyundai Motor Company, Seoul (KR); IUCF-HYU (Industry-University cooperation Foundation Hanyang University), Seoul (KR)

( * ) Notice: Subject to any disclaimer, the term of this patent is extended or adjusted under 35 U.S.C. 154(b) by 359 days.

(21) Appl. No.: 15/269,024

(22) Filed: Sep. 19, 2016

(65) Prior Publication Data

US 2017/0294671 A1    Oct. 12, 2017

(30) Foreign Application Priority Data

Apr. 8, 2016    (KR) ........................ 10-2016-0043379

(51) Int. Cl.
*H01M 8/1041* (2016.01)
*H01M 8/1051* (2016.01)
*H01M 12/08* (2006.01)
*H01M 8/1018* (2016.01)

(52) U.S. Cl.
CPC ....... *H01M 8/1055* (2013.01); *H01M 8/1051* (2013.01); *H01M 12/08* (2013.01);
(Continued)

(58) Field of Classification Search
CPC ......... H01M 12/08; H01M 2008/1095; H01M 2220/20; H01M 8/1051; H01M 8/1055
See application file for complete search history.

(56) References Cited

U.S. PATENT DOCUMENTS

| | | | |
|---|---|---|---|
| 5,928,391 A | 7/1999 | Lewin | |
| 2014/0178777 A1* | 6/2014 | Lee | ........................ H01M 4/366 |
| | | | 429/405 |

FOREIGN PATENT DOCUMENTS

| | | |
|---|---|---|
| JP | 2010-108802 A | 5/2010 |
| JP | 2014-165178 A | 9/2014 |

(Continued)

OTHER PUBLICATIONS

Woo, Hyun-Sik, et al., "Double-layer electrolyte system for improving cycling stability of rechargeable lithium-oxygen batteries." 2016 Fall meeting of the Korean Electrochemical Society, 2016.
(Continued)

*Primary Examiner* — Stewart A Fraser
*Assistant Examiner* — Victoria H Lynch
(74) *Attorney, Agent, or Firm* — Mintz Levin Cohn Ferris Glovsky and Popeo, P.C.; Peter F. Corless

(57) ABSTRACT

Disclosed herein are a lithium air battery having a multi-layered electrolyte membrane and a method of manufacturing the same. The lithium air battery includes a first electrolyte membrane capable of obtaining high ionic conductivity on a lithium negative electrode surface while minimizing the content of polymer and positioning a second electrolyte membrane with high resistance to oxygen radicals on the air electrode. Accordingly, the multi-layered (Continued)

electrolyte membrane can improve an electrolyte filling characteristic and a conductive characteristic of lithium ions, suppress oxygen radicals from being carried from an air electrode, and suppress a growth of lithium dendrite to largely improve a battery lifespan.

5 Claims, 10 Drawing Sheets

(52) U.S. Cl.
CPC ............... *H01M 2008/1095* (2013.01); *H01M 2220/20* (2013.01); *H01M 2300/002* (2013.01); *H01M 2300/0082* (2013.01); *H01M 2300/0091* (2013.01); *Y02E 60/128* (2013.01)

(56) References Cited

FOREIGN PATENT DOCUMENTS

| | | |
|---|---|---|
| JP | 2015-153532 A | 8/2015 |
| KR | 2012-0126956 A | 11/2012 |
| KR | 2013-0046247 A | 5/2013 |
| KR | 2015-0031377 A | 3/2015 |

OTHER PUBLICATIONS

Woo, Hyun-Sik, et al., "Bi-layer electrolyte system for lithium-oxygen batteries with enhanced cycling stability." 2015 Fall meeting of the Korean Electrochemical Society, 2015.

\* cited by examiner

LITHIUM AIR BATTERY HAVING MULTI-LAYERED ELECTROLYTE MEMBRANE AND MANUFACTURING METHOD THEREOF

CROSS-REFERENCE TO RELATED APPLICATION

This application claims under 35 U.S.C. § 119(a) the benefit of Korean Patent Application No. 10-2016-0043379 filed on Apr. 8, 2016, the entire contents of which are incorporated herein by reference.

TECHNICAL FIELD

The present invention relates to a lithium air battery having a multi-layered electrolyte membrane and a method manufacturing the same. The lithium air battery of the present invention may have a multi-layered electrolyte membrane such that an electrolyte filling characteristic and a conductive characteristic of lithium ions in the lithium air battery may be improved. In addition, in the lithium air battery, oxygen radicals may be prevented from being carried from an air electrode, and a growth of lithium dendrite to largely enhance a battery lifespan may be suppressed. The lithium air battery may be manufactured by positioning a first electrolyte membrane capable of obtaining high ionic conductivity on a lithium negative electrode surface while minimizing the content of polymer and positioning a second electrolyte membrane with high resistance to oxygen radicals on the air electrode.

BACKGROUND

A lithium air battery is an electrochemical energy conversion device which includes a lithium negative electrode, a lithium ion conductive electrolyte, and an air electrode in which reversible electrochemical reaction of oxygen and lithium ions may occur. Generally, the lithium air battery has theoretical energy density of 11,000 Wh/kg to provide high energy density as compared with a conventional lithium ion battery. Further, as compared with the conventional lithium ion battery, the lithium air battery is not expensive, is eco-friendly, and has excellent stability, and as a result, active research and development of the lithium air battery has been conducted as a power source for electric vehicles.

However, in order to commercialize such a lithium air battery, there are still many things to be improved. For example, rate of decomposition reaction during charging may be reduced by solid products such as $Li_2O_2$ which may be generated in the air electrode during discharging of the lithium air battery. Further, the solid products may not be dissolved in the liquid electrolyte to block pores of the air electrode, and as a result, charge/discharge efficiency may be reduced. Further, since the lithium air battery is driven in an open system unlike conventional lithium secondary battery, the used liquid electrolyte may be evaporated and deterioration of battery performance may occur.

In addition, the conventional lithium air battery has a problem that the battery performance may be rapidly reduced as the liquid electrolyte is easily evaporated during the charging and discharging processes, or loss due to leakage may be generated. Further, because a liquid electrolyte with high reactivity is used, there is a problem in that lithium dendrite may be formed on the lithium negative electrode during charging and discharging to deteriorate charge/discharge efficiency and a lifespan.

Accordingly, the research and development for solving problems including volatilization of the electrolyte and the growth of dendrite which are generated in the lithium air battery, oxidative decomposition of the polymer due to active oxygen radicals generated in the air electrode, and the like has been urgently required.

The above information disclosed in this Background section is only for enhancement of understanding of the background of the invention and therefore it may contain information that does not form the prior art that is already known in this country to a person of ordinary skill in the art.

SUMMARY OF THE INVENTION

In preferred aspect, the present invention provides a lithium air battery to solve problems including volatilization of an electrolyte generated in an existing lithium air battery, formation of dendrite, degradation of lifespan according to polymer decomposition, and the like. Accordingly, the present invention may provide a lithium air battery having a multi-layered electrolyte membrane that may be prepared by disposing a first electrolyte membrane, which is capable of obtaining high ionic conductivity and includes a lithium ion conductive inorganic electrolyte and polymer electrolyte, on a lithium negative electrode surface while minimizing the content of polymer and disposing a second electrolyte membrane with high resistance to oxygen radicals on the air electrode.

In one aspect of the present invention, provided is a lithium air battery having a multi-layered electrolyte membrane which may prevent volatilization of the electrolyte and may suppress the growth of the lithium dendrite thereby substantially improving battery lifespan.

The lithium air battery having a multi-layered electrolyte membrane may comprise: a lithium negative electrode; a first electrolyte membrane formed on the lithium negative electrode; a second electrolyte membrane formed on the first electrolyte membrane; and an air electrode formed on the second electrolyte membrane. In particular, the first electrolyte membrane may comprise a porous composite electrolyte which may comprise a lithium ion conductive inorganic electrolyte and a polymer electrolyte.

The term "porous" as used herein refers to containing vacancy, holes, vessels or pores, which can hold, absorb or be filled with gas or liquid material. In addition, the porous medium or substance containing inner vacancy, holes, vessels or pores also may allow fluid (gas or liquid) move, migrate, flow in or out, or be exchanged from the porous medium to outside. Although the pores or holes formed in the porous substance, for example, porous composite electrolyte, are particular limited in sizes or shapes thereof. Exemplary pores contained in the porous composite electrolyte in the present invention suitably may have an average pore size ranging from 1 nm to about 100 μm, or from about 10 nm to about 10 μm.

The term "composite electrolyte" as used herein refers to an electrolyte including at least two components having different properties (e.g. physical or chemical properties) and providing improved or new properties as being mixed. The composite electrolyte in the present invention may be formed of an inorganic component and an organic component, for example, the lithium ion conductive inorganic electrolyte and the polymer electrolyte.

In the first electrolyte membrane, the lithium ion conductive inorganic electrolyte and the polymer electrolyte suitably may be mixed in a weight ratio of about 80 to 90:10 to 20.

The lithium ion conductive inorganic electrolyte suitably may be at least one selected from the group consisting of oxide, phosphate, sulfide, and lithium phosphorousoxynitride (LiPON)-based inorganic materials. Preferably, the lithium ion conductive inorganic electrolyte may be lithium aluminum germanium phosphate.

The polymer electrolyte suitably may be a copolymer comprising one or two or more kinds selected from the group consisting of polyacrylonitrile, poly(vinylidene fluoride), poly(ethylene oxide), polyhexafluoropropylene, poly(methyl methacrylate), poly(vinyl acetate), poly(vinyl alcohol), polystyrene, poly(vinyl pyrrolidone), poly(vinyl chloride), and polybutadiene, and a mixture thereof.

In the first electrolyte membrane, an amount of about 5 to 10 wt % of a pore-forming additive may be further mixed with respect to the total weight combining the lithium ion conductive inorganic electrolyte and the polymer electrolyte. Preferably, the pore-forming additive may be dibutylphthalate.

The first electrolyte membrane may comprise pores having an average pore size of about 0.01 to 10 μm and porosity of about 20 to 30%.

Preferably, a liquid electrolyte comprising a lithium salt and an organic solvent may be absorbed in an amount of about 20 to 90 wt % in the first electrolyte membrane and the second electrolyte membrane, respectively.

The first electrolyte membrane suitably may have a thickness of about 20 to 80 μm and the second electrolyte membrane suitably may have a thickness of about 200 to 300 μm.

The second electrolyte membrane suitably may be at least one kind selected from the group consisting of a glass fiber, an olefin-based resin, a fluorine-based resin, an ester-based resin, and a cellulose-based non-woven fabric. Preferably, the olefin-based resin may be polyethylene, polypropylene or a mixture thereof, the fluorine-based resin may be poly(vinylidene fluoride), polytetrafluoroethylene or a mixture thereof, the ester-based resin may be poly(ethylene terephthalate), and the cellulose-based non-woven fabric is polysaccharide.

In another aspect, the present invention provides a method of manufacturing a lithium air battery. The method may comprise: (a) preparing a first electrolyte membrane by mixing a lithium ion conductive inorganic electrolyte, a polymer electrolyte, and a pore-forming additive with an organic solvent; (b) preparing a second electrolyte membrane; (c) laminating the second electrolyte membrane on the first electrolyte membrane; (d) soaking the laminated first and second electrolyte membranes in a liquid electrolyte; (e) forming a lithium negative electrode on the first electrolyte membrane prepared in step (d); and (f) forming an air electrode on the second electrolyte membrane prepared in step (d).

The lithium ion conductive inorganic electrolyte and the polymer electrolyte suitably may be mixed in a weight ratio of about 80 to 90:10 to 20 to prepare the first electrolyte membrane The lithium ion conductive inorganic electrolyte suitably may be at least one selected from the group consisting of oxide, phosphate, sulfide, and LiPON-based inorganic materials.

In addition, in the step (a), an amount of about 5 to 10 wt % of the pore-forming additive may be mixed with respect to the total weight combining the lithium ion conductive inorganic electrolyte and the polymer electrolyte.

The first electrolyte membrane may comprise pores having an average pore size of about 0.01 to 10 μm and porosity of about 20 to 30%.

The first electrolyte membrane suitably may have a thickness of about 20 to 80 μm and the second electrolyte membrane suitably may have a thickness of about 200 to 300 μm.

The second electrolyte membrane may be at least one kind selected from the group consisting of a glass fiber, an olefin-based resin, a fluorine-based resin, an ester-based resin, and a cellulose-based non-woven fabric.

Further provided is a vehicle comprising the lithium air battery as described herein.

According to the present invention, the lithium air batter may be manufactured to include the multi-layered electrolyte membrane by disposing a first electrolyte membrane including a lithium ion conductive inorganic electrolyte and a polymer electrolyte on a lithium negative electrode surface and disposing a second electrolyte membrane with high resistance to oxygen radicals on the air electrode. As such, an electrolyte filling characteristic and a conductive characteristic of lithium ions of the lithium air battery may be improved. In the lithium air battery of the present invention, oxygen radicals may be prevented from being carried from an air electrode, and volatilization of the electrolyte and a growth of lithium dendrite may be suppressed thereby substantially improving a battery lifespan.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
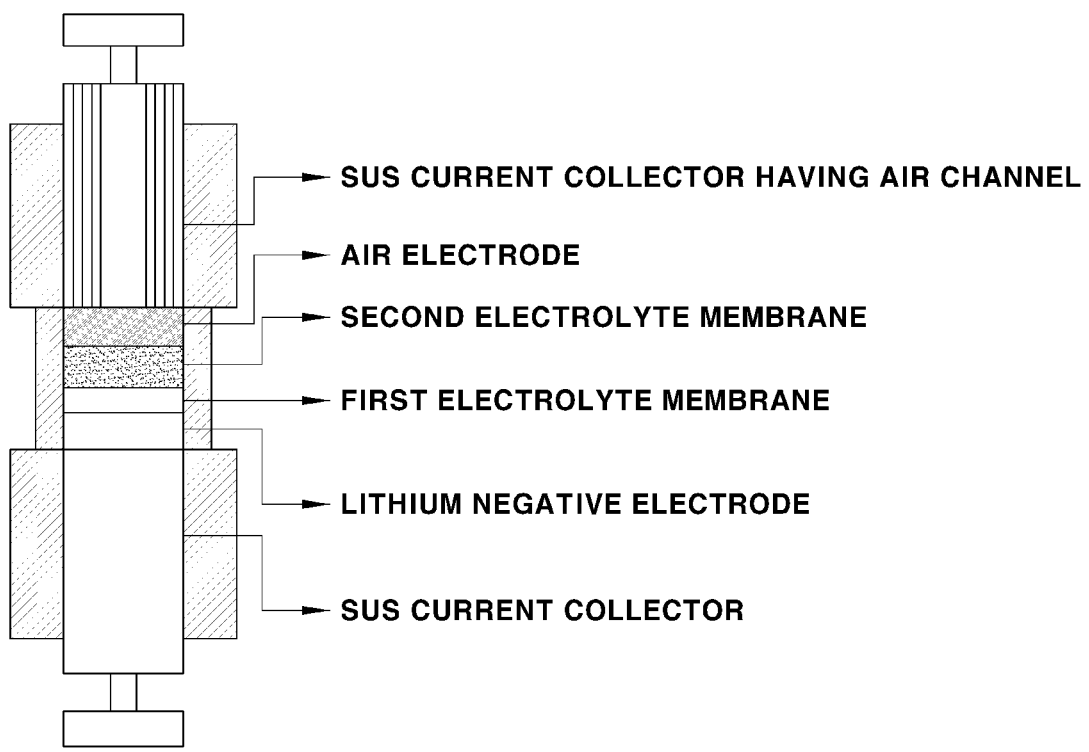
FIG. 1 shows a cross-sectional view of an exemplary lithium air battery having a multi-layered electrolyte membrane manufactured in Example 2 according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in more detail as an Example.

The present invention provides a lithium air battery having a multi-layered electrolyte membrane, which may include: a lithium negative electrode; a first electrolyte membrane formed on the lithium negative electrode; a second electrolyte membrane formed on the first electrolyte membrane; and an air electrode formed on the second electrolyte membrane. In particular, the first electrolyte membrane may comprise a porous composite electrolyte containing a lithium ion conductive inorganic electrolyte and a polymer electrolyte. Unless otherwise particularly indicated, the composite electrolyte in the present invention may include an organic/inorganic composite which is formed of an organic electrolyte material or an inorganic electrolyte material.

The lithium air battery of the present invention may feature applying the first and second electrolyte membranes as the multi-layered electrolyte membrane. Preferably, the first electrolyte membrane may prevent a liquid electrolyte from being volatilized by soaking the liquid electrolyte therein, improve conductivity of lithium ions by adding an inorganic solid electrolyte having lithium ionic conductivity, and further improve a battery lifespan by suppressing dendrite from being formed in the lithium negative electrode due to charge transfer reaction, which may occur in the entire interface between the electrode and the electrolyte. Further, when the first electrolyte membrane directly contacts the air electrode, decomposition of the polymer, which be caused by active oxygen radicals generated in the air electrode during charging and discharging processes, may be prevented by the second electrolyte membrane thereby preventing reduction of a lifespan characteristic of the battery.

According to the exemplary embodiment of the present invention, the first electrolyte membrane may be a porous organic/inorganic complex electrolyte membrane formed by mixing the lithium ion conductive inorganic electrolyte and the polymer electrolyte in a weight ratio of about 80 to 90:10 to 20. Preferably, when the content of the lithium ion conductive inorganic electrolyte is included in less amount than a weight ratio of about 80:20, the absorption amount of the liquid electrolyte may be increased, but ionic conductivity may be substantially reduced. On the contrary, when the content of the lithium ion conductive inorganic electrolyte is included in a greater amount than a weight ratio of about 90:10, the polymer may not be sufficiently bound with the inorganic material and thus, the electrolyte membrane may not be formed. The first electrolyte membrane may suppress volatilization of the liquid electrolyte in the lithium air battery and a growth of dendrite in the lithium negative electrode. The first electrolyte membrane may improve the ionic conductivity as compared with a conventional electrolyte membrane and substantially improve the lifespan of the lithium air battery by substantially reducing the amount of the polymer which may be decomposed by oxygen radicals.

According to the exemplary embodiment of the present invention, the lithium ion conductive inorganic electrolyte may include at least one kind selected from the group consisting of oxide, phosphate, sulfide, and LiPON-based inorganic materials. Preferably, the oxide-based inorganic material may use an inorganic material consisting of a single component or two or more components represented by for example, $Li_{3x}La_{2/(3-x)}TiO_3$ ($0<X\leq2$) and $Li_{7-y}La_{3-x}A_xZr_{2-y}$ $M_yO_{12}$ (herein, A is a metal such as Y, Nd, Sm, or Gd, M is Nb or Ta, $0 \leq x < 3$, and $0 \leq y < 2$). The phosphate-based inorganic material may include an inorganic material selected from the group consisting of a single component or two or more components represented by $Li_{1+x+y}(Al,Ga)_x(Ti,Ge)_{2-x}Si_yP_{3-y}O_{12}$ (herein, $0 \leq x \leq 1$ and $0 \leq y \leq 1$). The sulfide-based inorganic material may include an inorganic material consisting of at least one component selected from the group consisting of $Li_2S$, $Li_2S$—$P_2S_5$, $Li_2S$—$SiS_2$, $Li_2S$—$GeS_2$, $Li_2S$—$B_2S_5$, and $Li_2S$—$Al_2S_5$. The LiPON-based inorganic material may include an inorganic material consisting of a single component or two or more components represented by $Li_{3-y}PO_{4-x}N_x$ (herein, $0 < y < 3$ and $0 < x < 4$). Preferably, the lithium ion conductive inorganic electrolyte may include lithium aluminum germanium phosphate.

According to the exemplary embodiment of the present invention, the polymer electrolyte may use a copolymer copolymerized with one or two or more kinds selected from the group consisting of polyacrylonitrile, poly(vinylidene fluoride), poly(ethylene oxide), polyhexafluoropropylene, poly(methyl methacrylate), poly(vinyl acetate), poly(vinyl alcohol), polystyrene, poly(vinyl pyrrolidone), poly(vinyl chloride), and polybutadiene, and a mixture thereof. Preferably, the polymer electrolyte may include a poly(vinylidene fluoride-hexafluoropropylene) copolymer.

According to the exemplary embodiment of the present invention, in the first electrolyte membrane, an amount of about 5 to 10 wt % of a pore-forming additive may be further mixed with respect to the total weight combining lithium ion conductive inorganic electrolyte and the polymer electrolyte. In detail, the pore-forming additive may improve the ionic conductivity of the electrolyte membrane and increase the moisture content of the electrolyte by providing porosity to the first electrolyte membrane. Preferably, the pore-forming additive may use dibutylphthalate.

According to the exemplary embodiment of the present invention, a liquid electrolyte including a lithium salt and an organic solvent may be absorbed in the amount of about 20 to 90 wt % in the first electrolyte membrane and the second electrolyte membrane, based on the total weight of the first electrolyte membrane and the second electrolyte membrane, respectively. In detail, the liquid electrolyte consisting of the lithium salt and the organic solvent may be absorbed in the first and second electrolyte membranes to form an electrolyte membrane without leakage. When the absorption amount of the absorbed liquid electrolyte is less than about 20 wt %, improved ionic conductivity may not be obtained. When the absorption amount of the absorbed liquid electrolyte is greater than about 90 wt %, the processing problem due to a leakage phenomenon of the electrolyte or reduction of mechanical properties of the electrolyte membrane may occur during cell assembling. Preferably, the liquid electrolyte may be absorbed on the first electrolyte membrane or the second electrolyte membrane in the amount of about 40 to 50 wt % based on the total weight of the first electrolyte membrane or the second electrolyte membrane.

According to the exemplary embodiment of the present invention, the first electrolyte membrane may have an average pore size of about 0.01 to 10 μm and porosity of about 20 to 30%. The first electrolyte membrane may be formed on the lithium negative electrode as the porous organic/inorganic complex electrolyte membrane containing the lithium ion conductive inorganic electrolyte and the polymer electrolyte to suppress lithium dendrite and fill the liquid electrolyte. In the first electrolyte membrane, when the average pore size is less than about 0.01 μm, the reduction of the ionic conductivity may be caused by reducing the absorption amount of the liquid electrolyte for the electrolyte membrane. In addition, when the average pore size is greater than about 10 μm, the reduction of the mechanical properties of the electrolyte membrane may be caused. Preferably, the average pore size may be from about 0.5 to about 1 μm.

According to the exemplary embodiment of the present invention, the first electrolyte membrane may have a thickness of about 20 to 80 μm and the second electrolyte membrane may have a thickness of about 200 to 300 μm, respectively. When the thickness of the first electrolyte membrane is less than about 20 μm, the mechanical stability may be deteriorate, and when the thickness is greater than about 80 μm, the cell characteristic may deteriorate due to an increase in resistance in the entire battery. Preferably, the thickness of the first electrolyte membrane may range from about 60 to about 70 μm and the second electrolyte membrane may have a thickness of about 250 μm.

According to the exemplary embodiment of the present invention, the second electrolyte membrane may use at least one kind selected from the group consisting of a glass fiber, an olefin-based resin, a fluorine-based resin, an ester-based resin, and a cellulose-based non-woven fabric. For example, the glass fiber may be stable to active oxygen radicals. In detail, the olefin-based resin may include polyethylene, polypropylene or a mixture thereof, the fluorine-based resin may include polyvinylidene fluoride, polytetrafluoroethylene or a mixture thereof, the ester-based resin may include polyethylene terephthalate, and the cellulose-based non-woven fabric may include polysaccharide. Preferably, the second electrolyte membrane may include the glass fiber.

The present invention may also provide a manufacturing method of a lithium air battery. The method may comprise: (a) preparing a first electrolyte membrane by mixing a lithium ion conductive inorganic electrolyte, a polymer electrolyte, and a pore-forming additive with an organic solvent; (b) preparing a second electrolyte membrane; (c) laminating the second electrolyte membrane on the first electrolyte membrane; (d) soaking the laminated first and second electrolyte membranes in a liquid electrolyte; (e) forming a lithium negative electrode on the first electrolyte membrane prepared in step (d); and (f) forming an air electrode on the second electrolyte membrane prepared in step (d).

According to the exemplary embodiment of the present invention, in step (a), the lithium ion conductive inorganic electrolyte and the polymer electrolyte may mixed and dispersed in the organic solvent in a weight ratio of about 80 to 90:10 to 20. The organic solvent may not be particularly limited, and exemplary organic solvent may include acetone. Further, the first electrolyte membrane may be prepared by adding the pore-forming additive of about 5 to 10 wt % to the dispersed mixture.

According to the exemplary embodiment of the present invention, in step (b), a glass fiber separation membrane may be used as the second electrolyte membrane.

According to the exemplary embodiment of the present invention, in step (d), the soaking may be performed for about 12 to 24 hours at a temperature of about 25 to 35° C. In this case, the electrolyte including the lithium salt and the organic solvent may be absorbed in the amount of about 20 to 90 wt % in the first electrolyte membrane and the second electrolyte membrane, respectively.

According to the exemplary embodiment of the present invention, in step (f), the air electrode formed on the second electrolyte membrane may be attached by step (d). For example, the air electrode may be soaked in the liquid electrolyte and laminated.

The lithium air battery according to the present invention may provide improvements in an electrolyte filling characteristic and a conductive characteristic of lithium ions by applying the multi-layered electrolyte membrane, which may be formed by disposing a first electrolyte membrane including a lithium ion conductive inorganic electrolyte and a polymer electrolyte on the lithium negative electrode surface and disposing a second electrolyte membrane with high resistance to oxygen radicals on the air electrode. As such, oxygen radicals may be prevented from being carried from an air electrode, and volatilization of the electrolyte and a growth of lithium dendrite may be suppressed thereby substantially increasing a battery lifespan.

EXAMPLES

The following examples illustrate the invention and are not intended to limit the same.

Example 1: Preparation of First Electrolyte Membrane (Porous Organic/Inorganic Complex Electrolyte Membrane)

According to a composition ratio of the following Table 1, lithium aluminum germanium phosphate (LAGP) as the lithium ion conductive inorganic electrolyte and poly(vinylidene fluoride-co-hexafluoropropylene) (PVdF-co-HFP) as the polymer electrolyte were dispersed in an acetone solvent. Thereafter, a porous organic/inorganic composite electrolyte solution was prepared by adding dibutyl phthalate (DBP) as the pore-forming additive. Subsequently, the prepared porous organic/inorganic composite electrolyte solution was poured on a glass plate and cast by a doctor blade with a predetermined thickness of 500 μm to prepare the first electrolyte membrane (the porous organic/inorganic complex electrolyte membrane). After the porous organic/inorganic composite electrolyte solution was left at room temperature for 20 minutes so that acetone as the solvent was naturally volatilized, the porous organic/inorganic complex electrolyte solution was immersed in methanol to be phase-transited with DBP as an extract for 12 hours. Thereafter, the membrane through the extracting process was dried for 12 hours in a vacuum oven of at a temperature of 90° C. to prepare the first electrolyte membrane (the porous organic/inorganic complex electrolyte membrane) having an average pore size of 0.5 to 1 μm and a thickness of 70 μm.

TABLE 1

| Classification | Composition of first electrolyte membrane (weight ratio) | LAGP | P(VdF-co-HFP) | Acetone | DBP |
|---|---|---|---|---|---|
| Example 1-1 | LAGP: P(VdF-co-HFP) (90:10) | 1.8 | 0.2 | 3.4 | 0.2 |
| Example 1-2 | LAGP: P(VdF-co-HFP) (80:20) | 1.6 | 0.4 | 4.8 | 0.4 |

(Unit: g)

Example 2: Manufacture of Lithium Air Battery

A membrane made of glass fiber (GF/C of Whatman Corporation) and having a thickness of 250 μm was used as the second electrolyte membrane. An electrolyte membrane having a multi-layered structure was formed by laminating the second electrolyte membrane on the first electrolyte membrane prepared in Example 1-1 and then soaked in the liquid electrolyte. In this case, the liquid electrolyte was a liquid electrolyte containing lithium ions prepared by dissolving 1 M of LiTFSI in TEGDME. The first and second electrolyte membranes were soaked in the liquid electrolyte of 50 wt % based on the total weight of the first electrolyte membrane and the second electrolyte membrane, respectively. The air electrode was dispersed in an n-methyl-2-pyrrolidone (NMP) solvent by mixing Ketjen black (KB600) as conductive carbon and polyvinylidene fluoride (PVdF) as a binder in a weight ratio of 90:10. Next, the air electrode was uniformly coated on a gas diffusion layer (GDL) and then vacuum-dried at a temperature of 110° C. and thus prepared. As the negative electrode, lithium foil with a thickness of 400 μm was used. By using the prepared negative electrode and air electrode, as the structure illustrated in FIG. 1, the lithium air battery was manufactured in order of the lithium negative electrode, the first electrolyte membrane, the second electrolyte membrane, and the air electrode.

Comparative Example 1: Preparation of First Electrolyte Membrane Using Inorganic Material Without Lithium Ion Conductivity A first electrolyte membrane using alumina ($Al_2O_3$) as an inorganic material without lithium ion conductivity was prepared by the same method as Example 1 with a composition ratio illustrated in the following Table 2.

TABLE 2

| Classification | Composition of first electrolyte membrane (weight ratio) | Alumina | LAGP | P(VdF-co-HFP) | Acetone | DBP |
|---|---|---|---|---|---|---|
| Comparative Example 1-1 | Alumina: P(VdF-co-HFP) (90:10) | 1.8 | — | 0.2 | 3.4 | 0.2 |
| Comparative Example 1-2 | Alumina: P(VdF-co-HFP) (80:20) | 1.6 | — | 0.4 | 4.8 | 0.4 |
| Comparative Example 1-3 | LAGP: P(VdF-co-HFP) (70:30) | — | 1.4 | 0.6 | 6.2 | 0.6 |
| Comparative Example 1-4 | LAGP: P(VdF-co-HFP) (60:40) | — | 1.2 | 0.8 | 7.6 | 0.8 |

TABLE 2-continued

| Classification | Composition of first electrolyte membrane (weight ratio) | Alumina | LAGP | P(VdF-co-HFP) | Acetone | DBP |
|---|---|---|---|---|---|---|
| Comparative Example 1-5 | LAGP:P(VdF-co-HFP) (0:100) | — | — | 2.0 | 12.0 | 0.8 |

(Unit: g)

Figure 2:
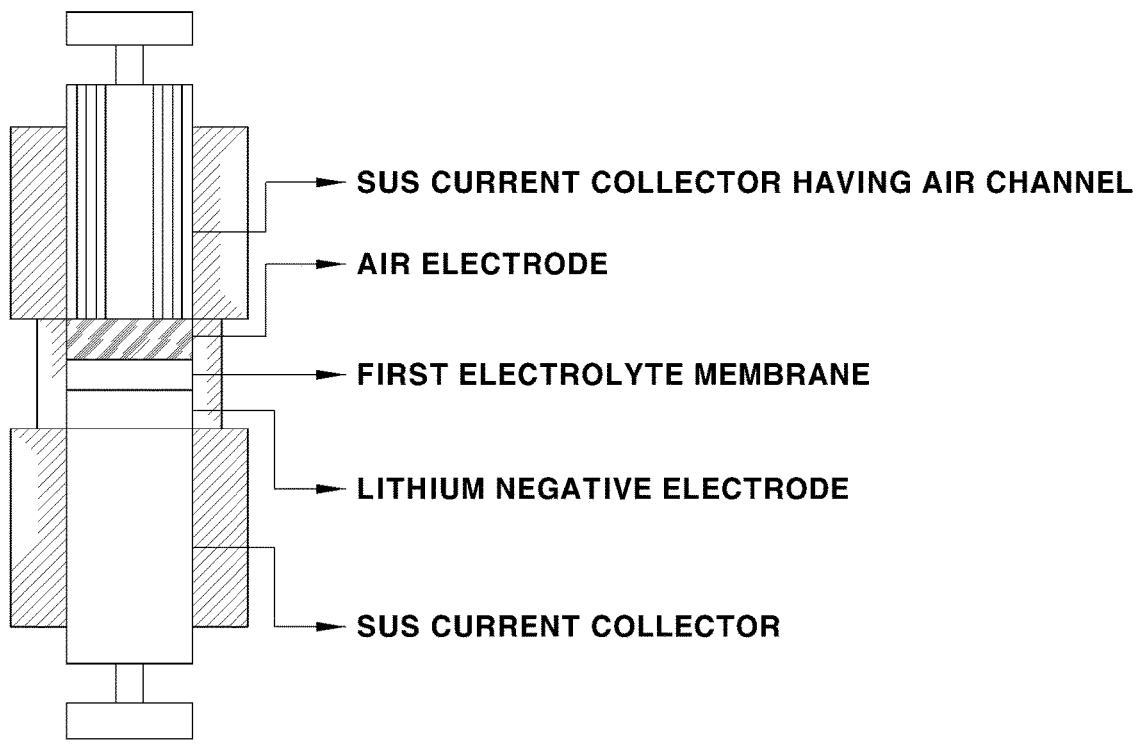
FIG. 2 shows a cross-sectional view of an exemplary lithium air battery manufactured in Comparative Example 2 of the present invention.

Comparative Example 2: Manufacture of Lithium Air Battery Using First Electrolyte Membrane with Lithium Ion Conductivity Alone In order to compare performance of the lithium air battery manufactured in Example 2, the lithium air battery was manufactured in order of the lithium negative electrode, the first electrolyte membrane, and the air electrode as the structure illustrated in FIG. 2 by using the porous organic/inorganic composite electrolyte membrane alone which was obtained by soaking the first electrolyte membrane prepared in Example 1-1 in the liquid electrolyte without the glass fiber separation membrane.

Comparative Example 3: Manufacture of Lithium Air Battery Using First Electrolyte Membrane without Lithium Ion Conductivity Alone In order to compare performance of the lithium air battery manufactured in Example 2, the lithium air battery was manufactured in order of the lithium negative electrode, the first electrolyte membrane, and the air electrode by using the first electrolyte membrane which was obtained by soaking the first electrolyte membrane prepared in Comparative Example 1-2 in the liquid electrolyte without the separation membrane.

Figure 3:
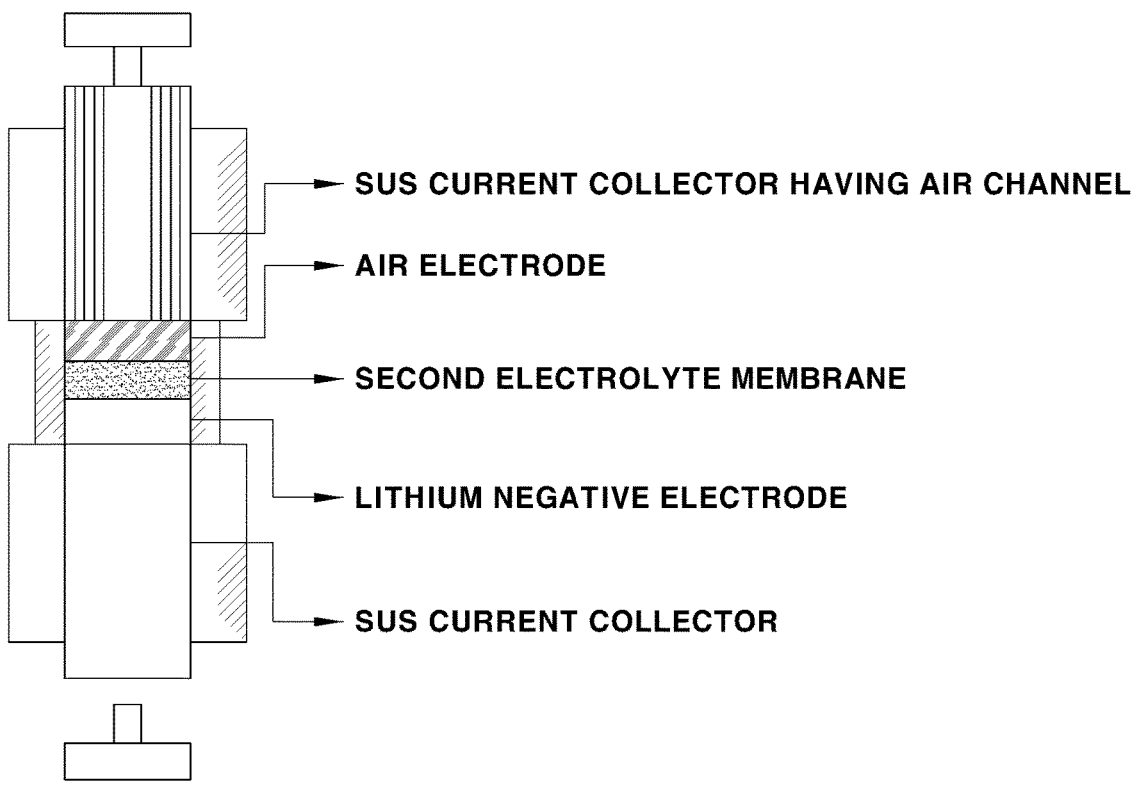
FIG. 3 shows a cross-sectional view of an exemplary lithium air battery manufactured in Comparative Example 4 of the present invention.

Comparative Example 4: Manufacture of Lithium Air Battery Using Second Electrolyte Membrane Alone In order to compare performance of the lithium air battery manufactured in Example 2, the lithium air battery was manufactured in order of the lithium negative electrode, the second electrolyte membrane, and the air electrode as the structure illustrated in FIG. 3 by soaking only the second electrolyte membrane made of a glass fiber (thickness of 260 μm and Whatman's product) in the liquid electrolyte without the first electrolyte membrane and sandwiching the second electrolyte membrane between the negative electrode and the air electrode.

Comparative Example 5: Manufacture of Lithium Air Battery Having Multi-Layered Structure Applying First Electrolyte Membrane without Lithium Ion Conductivity and Second Electrolyte Membrane Made of Glass Fiber In order to compare performance of the lithium air battery manufactured in Example 2, the lithium air battery was manufactured in order of the lithium negative electrode, the first electrolyte membrane, the second electrolyte membrane, and the air electrode as the same structure as FIG. 1 by using the first electrolyte membrane prepared in Comparative Example 1-2 and the second electrolyte membrane made of glass fiber.

Test Examples

Test Example 1

The ionic conductivity and the electrolyte absorption amount of the first electrolyte membranes prepared in Examples 1-1 and 1-2 and Comparative Examples 1-1 to 1-5 were measured and the result thereof are shown in the following Table 3. The ionic conductivity and the electrolyte absorption amount were measured after soaking the first electrolyte membrane in the liquid electrolyte in which 1 M of lithium bis(trifluoromethane sulfonyl)imide (LiTFSI) salt was dissolved in tetraethylene glycol dimethyl ether (TEGDME).

TABLE 3

| Classification | Composition of first electrolyte membrane (weight ratio) | Ionic conductivity (S/cm) | Absorption amount of electrolyte (%) |
|---|---|---|---|
| Example 1-1 | LAGP:P(VdF-co-HFP) (90:10) | $6.4 \times 10^{-4}$ | 48.5 |
| Example 1-2 | LAGP:P(VdF-co-HFP) (80:20) | $4.5 \times 10^{-4}$ | 50.0 |
| Comparative Example 1-1 | Alumina:P(VdF-co-HFP) (90:10) | — | — |
| Comparative Example 1-2 | Alumina:P(VdF-co-HFP) (80:20) | $2.0 \times 10^{-4}$ | 49.2 |
| Comparative Example 1-3 | LAGP:P(VdF-co-HFP) (70:30) | $2.9 \times 10^{-4}$ | 53.5 |
| Comparative Example 1-4 | LAGP:P(VdF-co-HFP) (60:40) | $2.7 \times 10^{-4}$ | 61.3 |
| Comparative Example 1-5 | LAGP:P(VdF-co-HFP) (0:100) | $1.1 \times 10^{-5}$ | 83.9 |

According to the result of Table 3, in Examples 1-1 and 1-2, it was confirmed that even though the absorption amount of the electrolyte was reduced as the amount of LAGP was increased, the ionic conductivity was increased. It can be seen that the ionic conductivity was substantially improved by providing an effective lithium ion transfer path in LAGP as the lithium ion conductive inorganic electrolyte contained in the first electrolyte membrane.

In Comparative Example 1-1, an electrolyte property was not ensured and the first electrolyte membrane was not formed at all, and thus, the ionic conductivity and the electrolyte absorption amount were not measured. Compared with Examples 1-1 and 1-2, where LAGP having the same ionic conductivity of $2.0 \times 10^{-4}$ to $2.7 \times 10^{-4}$ S/ was used, Comparative Examples 1-2 to 1-4 showed similar absorption amounts of the electrolyte, but a half or less of the ionic conductivity. Further, in Comparative Example 1-5, it was confirmed that even though the first and second lithium ion conductive electrolyte membranes were constituted, the ionic conductivity was much low by using the first electrolyte membrane without the lithium ion conductivity.

Test Example 2

In order to observe the charge/discharge characteristic of the lithium air battery manufactured in Example 2 and Comparative Examples 2, 3, 4, and 5, the charge/discharge characteristic was respectively measured by a method of repetitively charging and discharging the lithium air battery for 10 hours by applying predetermined current of 100 mA/g, and the result thereof was illustrated in FIGS. 4, 5, 6, 7, and 8.

Figure 4:
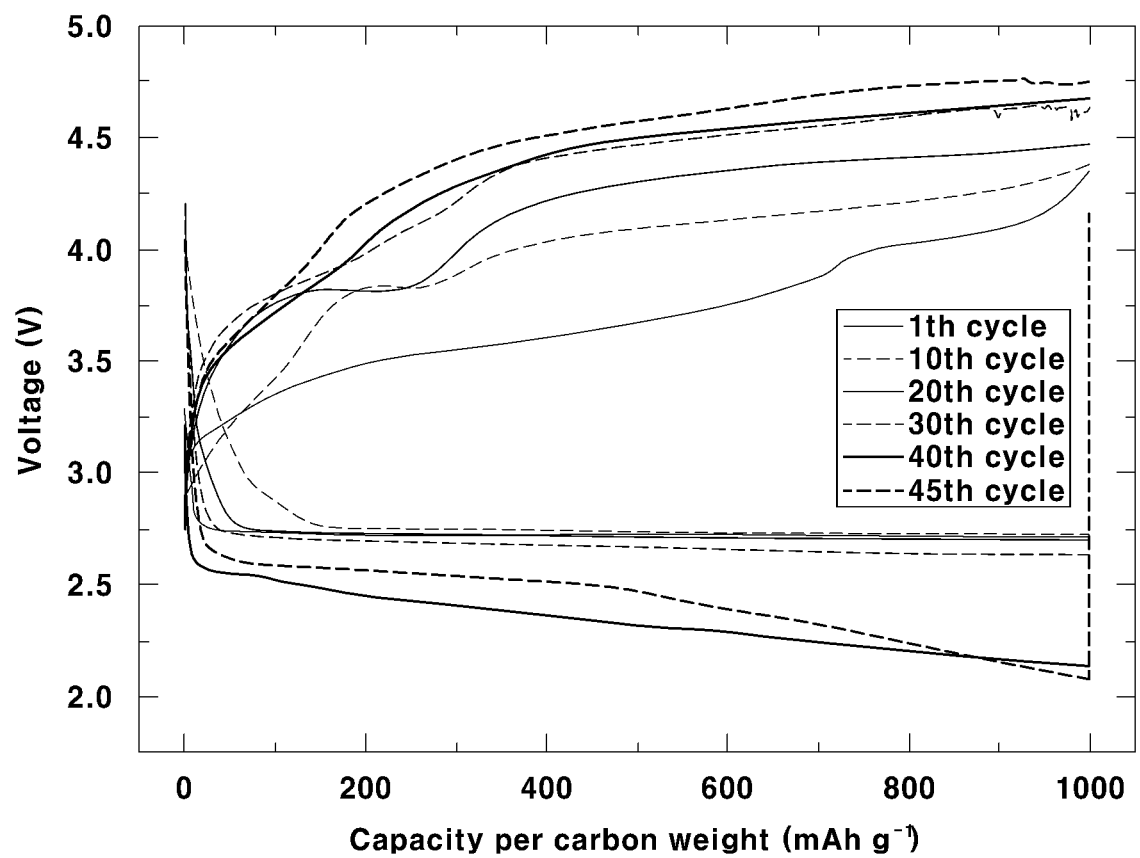
FIG. 4 is a charging/discharging graph of an exemplary lithium air battery manufactured in Example 2 according to an exemplary embodiment of the present invention.

FIG. 4 is a charging/discharging graph of the lithium air battery manufactured in Example 2 of the present invention. In FIG. 4, it was confirmed that the lithium air battery was formed as the multi-layered structure of the first and second electrolyte membranes to reduce degradation of the polymer electrolyte by suppressing an attack of oxygen radicals and to suppress the electrolyte from being volatilized. Further, it was confirmed that the lifespan was substantially increased about 45 times.

Figure 5:
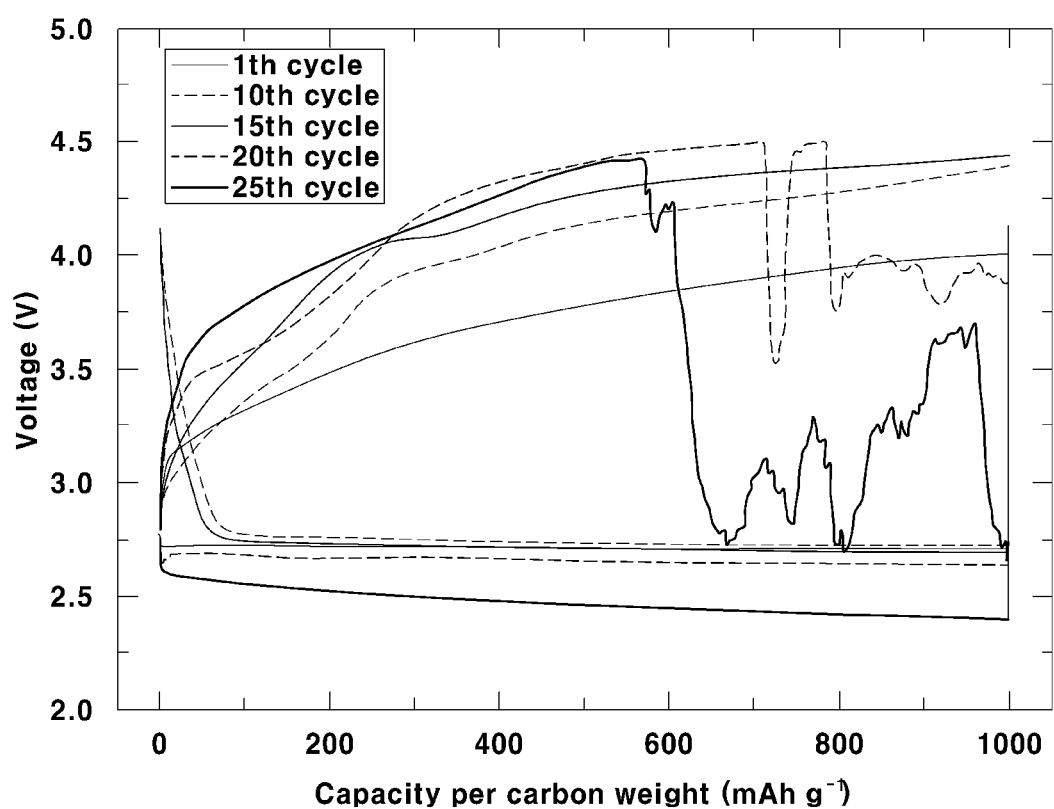
FIG. 5 is a charging/discharging graph of an exemplary lithium air battery manufactured in Comparative Example 2 of the present invention.

FIG. 5 is a charging/discharging graph of the lithium air battery manufactured in Comparative Example 2 of the present invention. In FIG. 5, in the case of Comparative Example 2 using only the porous organic/inorganic complex electrolyte, the degradation of the polymer was shown, and particularly, in the charging process, an unstable state where voltage was shaking was shown, and the lifespan of about 25 times was shown.

Figure 6:
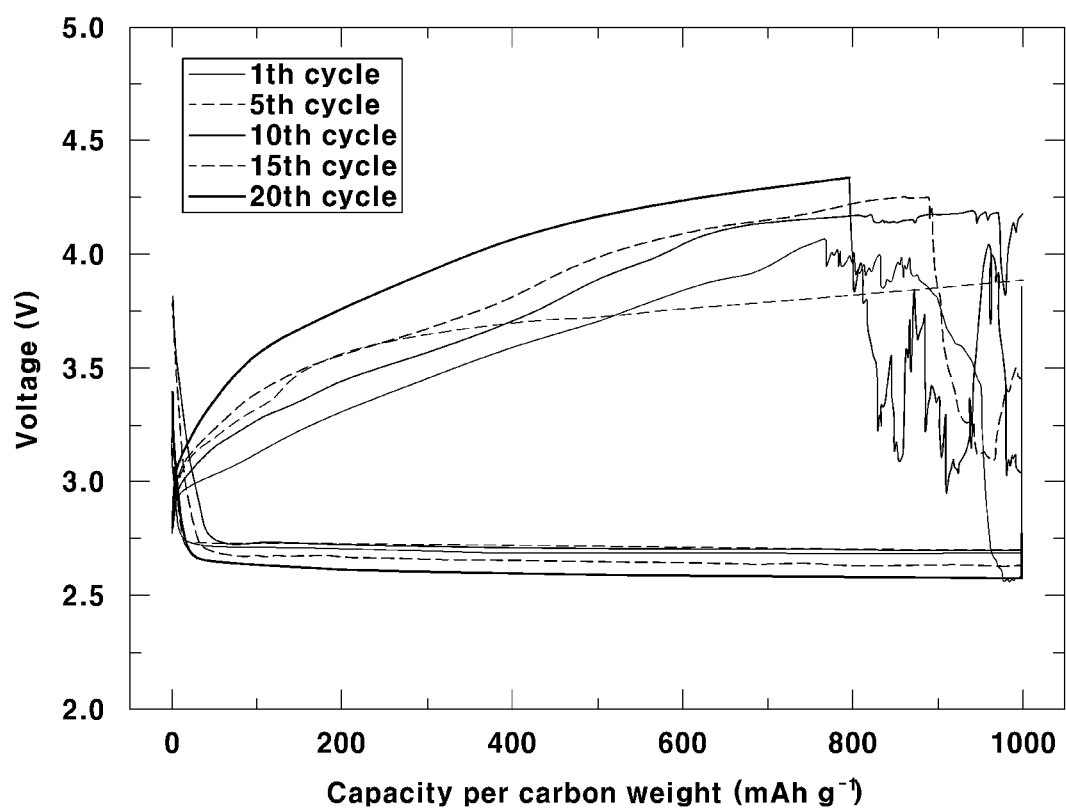
FIG. 6 is a charging/discharging graph of an exemplary lithium air battery manufactured in Comparative Example 3 of the present invention.

FIG. 6 is a charging/discharging graph of the lithium air battery manufactured in Comparative Example 3 of the present invention. In FIG. 6, when only the porous organic/inorganic composite electrolyte was used without lithium ion conductivity, particularly during the charging process, the voltage was seriously shaken and the short lifespan of about 20 times was shown.

Figure 7:
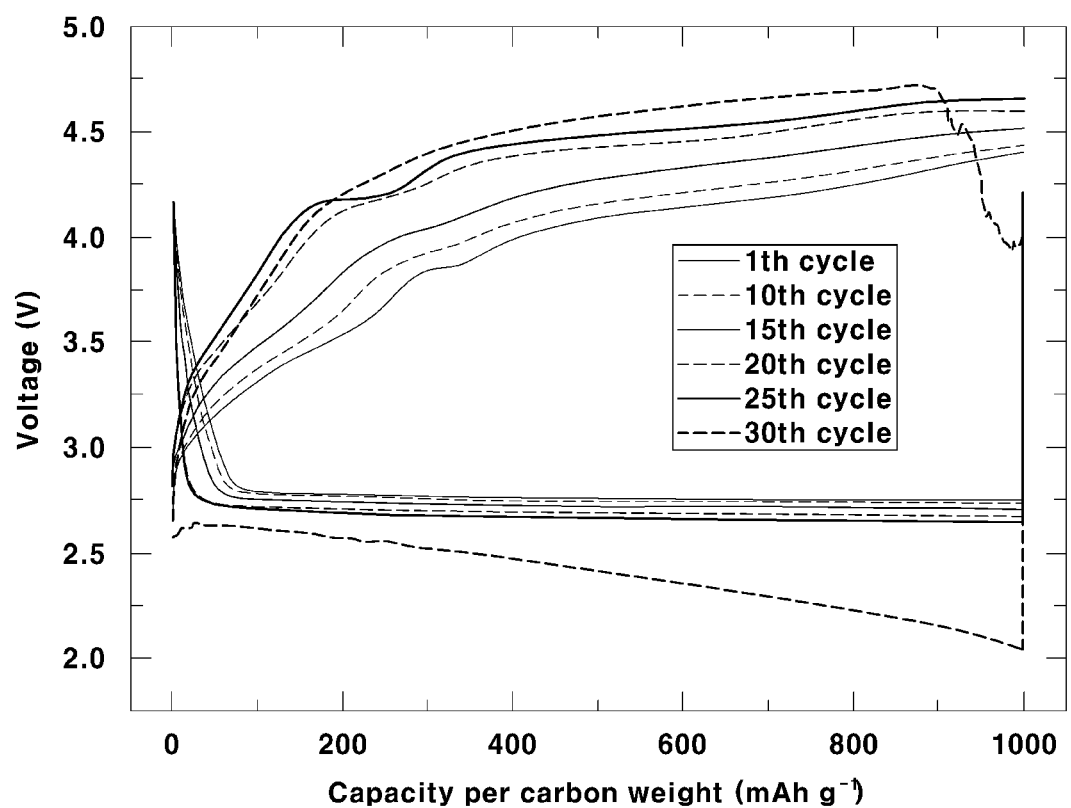
FIG. 7 is a charging/discharging graph of an exemplary lithium air battery manufactured in Comparative Example 4 of the present invention.

FIG. 7 is a charging/discharging graph of the lithium air battery manufactured in Comparative Example 4 of the present invention. In FIG. 7, the lifespan characteristic of about 30 times was shown without shaking of the voltage by using the lithium air battery using only the glass fiber separation membrane. Thereafter, it was shown that overvoltage was substantially increased by an increase in resistance in the battery due to volatilization of the liquid electrolyte depending on the cycle.

Figure 8:
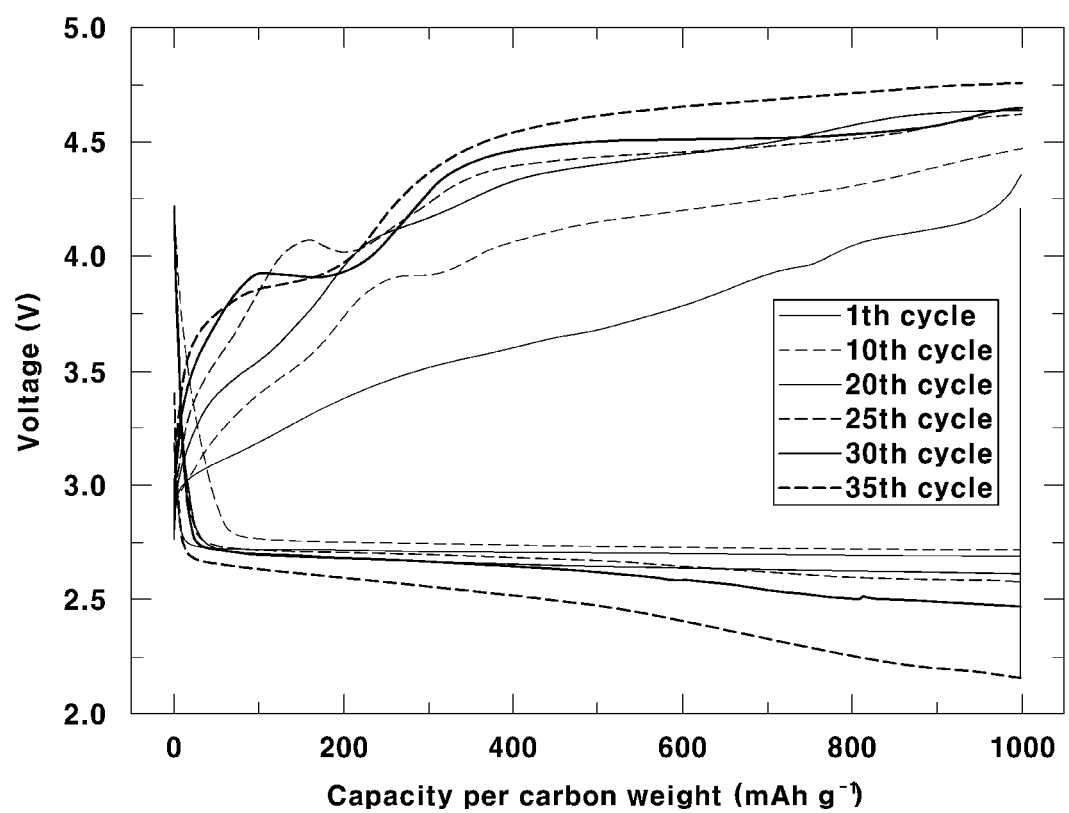
FIG. 8 is a charging/discharging graph of an exemplary lithium air battery manufactured in Comparative Example 5 of the present invention.

FIG. 8 is a charging/discharging graph of the lithium air battery manufactured in Comparative Example 5 of the present invention. In FIG. 8, as the result of using the multi-layered electrolyte membrane, the charge/discharge characteristic was excellent as compared with Comparative Examples 2, 3, and 4, but as a result, the low lifespan characteristic was shown as compared with Example 2 of FIG. 4.

Test Example 3

Figure 9:
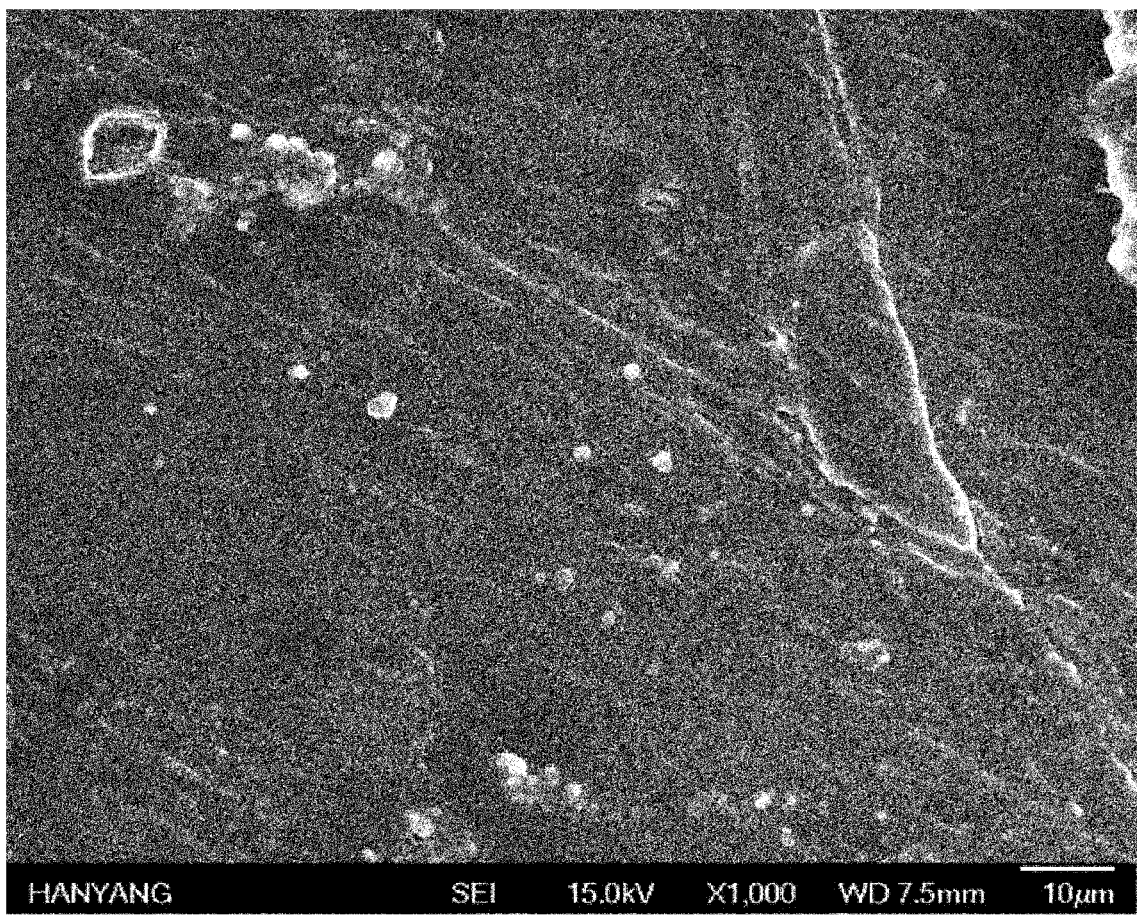
FIG. 9 shows an image from a scanning electron microscopy for an exemplary lithium metal surface in a charging state after a fifth cycle of an exemplary lithium air battery manufactured in Example 2 according to an exemplary embodiment of the present invention.
Figure 10:
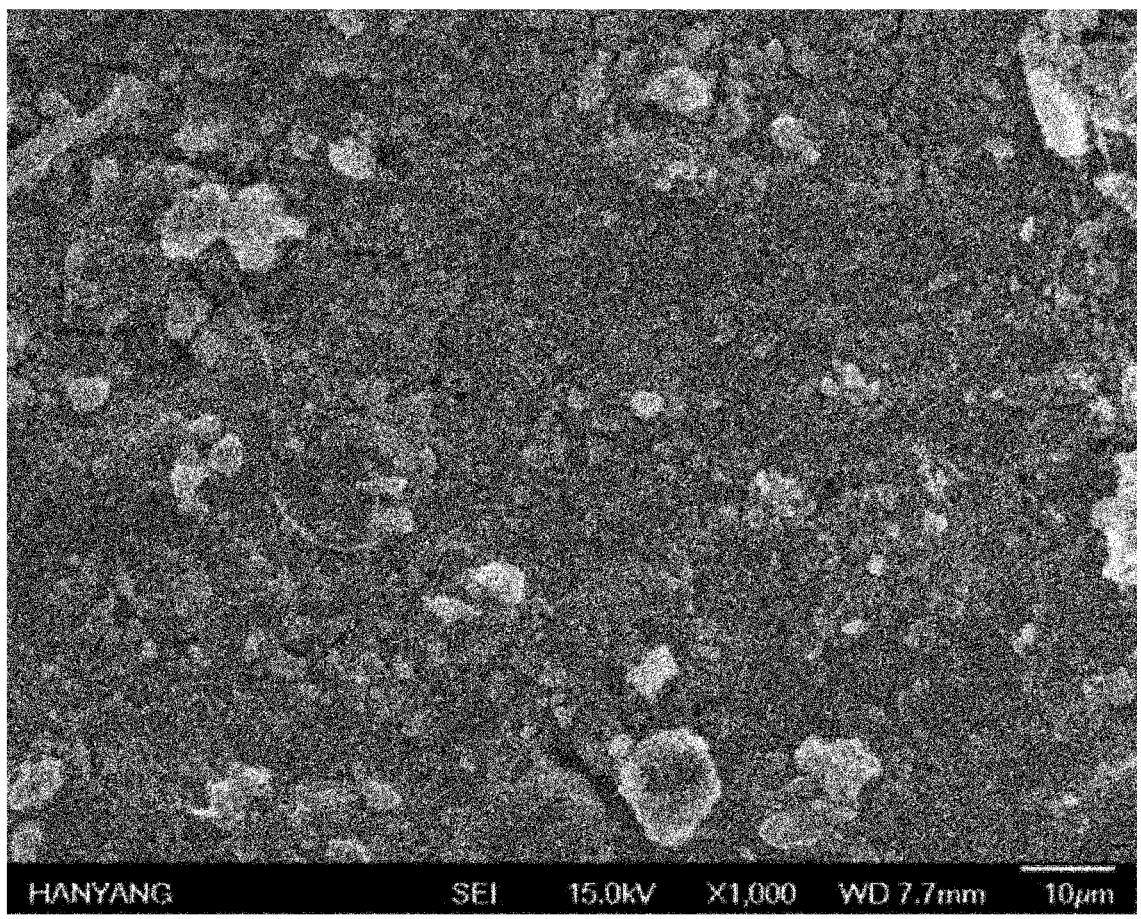
FIG. 10 shows an image from a scanning electron microscopy for an exemplary lithium metal surface in a charging state after a fifth cycle of an exemplary lithium air battery manufactured in Comparative Example 4 of the present invention.

In order to see a lithium metal surface of the lithium air battery manufactured in Example 2 and Comparative Example 4, the lithium metal surface was measured by using a scanning electron microscope, and the result thereof was illustrated in FIGS. 9 and 10.

FIG. 9 is a scanning electron micrograph for a lithium metal surface in a charging state after a fifth cycle of the lithium air battery manufactured in Example 2 of the present invention. As shown in FIG. 9, when the multi-layered electrolyte membrane was used, it was confirmed that the growth of lithium dendrite was suppressed and thus the lithium metal surface was maintained in a clear state.

FIG. 10 is a scanning electron micrograph for a lithium metal surface in a charging state after a fifth cycle of the lithium air battery manufactured in Comparative Example 4 of the present invention. In FIG. 10, when only an existing separation membrane was applied, dendrite was grown on the lithium metal surface and the surface was uneven to deteriorate the charge/discharge characteristic.

Test Example 4

Figure 11:
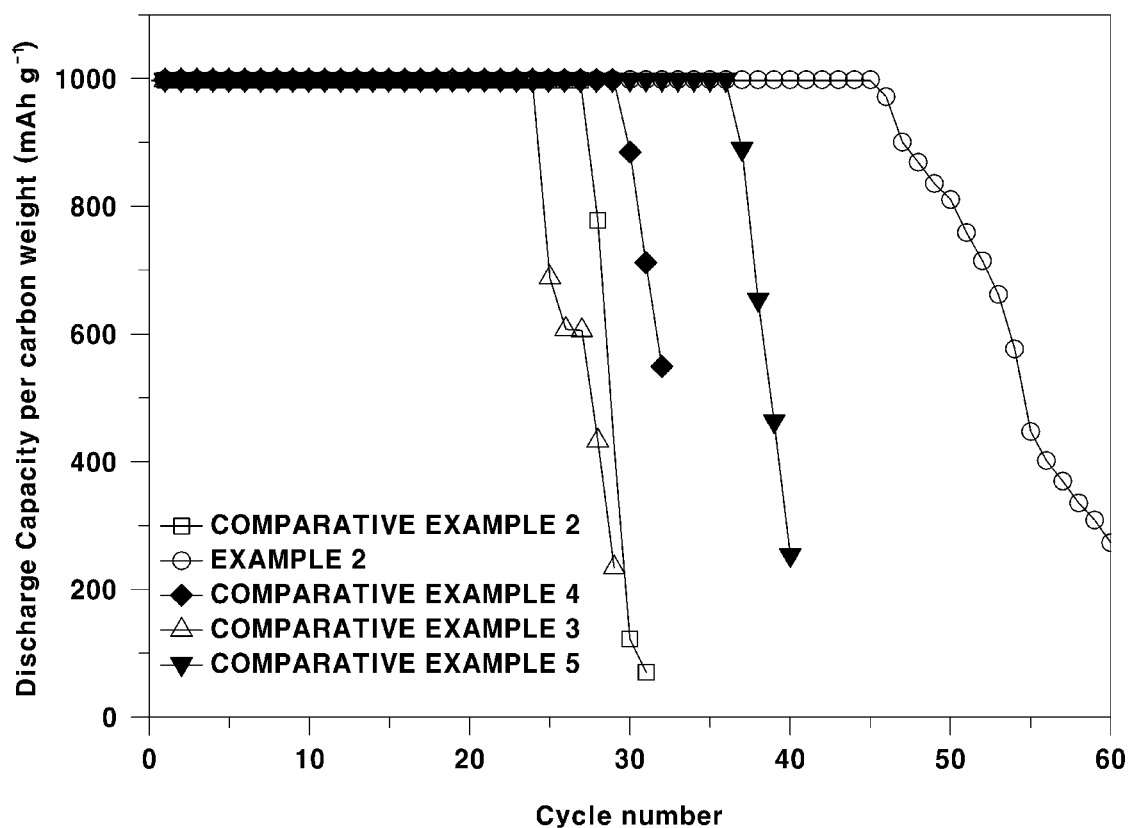
FIG. 11 is a discharge capacity graph according to the number of charging and discharging times of exemplary lithium air batteries manufactured in Example 2 and Comparative Examples 2, 3, 4, and 5 of the present invention.

The discharge capacity according to the number of charging and discharging times of the lithium air battery manufactured in Example 2 and Comparative Examples 2, 3, 4, and 5 was measured by a method of repetitively charging and discharging the lithium air battery for 10 hours by applying predetermined current of 100 mA/g, and the result thereof was shown in FIG. 11.

FIG. 11 is a discharge capacity graph according to the number of charging and discharging times of the lithium air batteries manufactured in Example 2 and Comparative Examples 2, 3, 4, and 5 of the present invention. In FIG. 11, when the electrolyte membrane was formed in the multi-layered structure, for example, in Example 2, it was confirmed that the discharge characteristic was substantially increased as compared with Comparative Examples 2, 3, 4, and 5.

The lithium air battery of the present invention may be manufactured to include the multi-layer electrolyte, by disposing a first electrolyte membrane including a lithium ion conductive inorganic electrolyte and a polymer electrolyte on a lithium negative electrode surface and disposing a second electrolyte membrane with high resistance to oxygen radicals on the air electrode. Accordingly, it can be seen that the ionic conductivity may be substantially improved, the growth of lithium dendrite may be suppressed, and as a result, the lifespan characteristic of the battery may be substantially increased.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a lithium air battery, comprising:
   (a) preparing a first electrolyte membrane by mixing a lithium ion conductive inorganic electrolyte, a polymer electrolyte, and a pore-forming additive with an organic solvent;
   (b) preparing a second electrolyte membrane;
   (c) laminating the second electrolyte membrane on the first electrolyte membrane;
   (d) soaking the laminated first and second electrolyte membranes in a liquid electrolyte;
   (e) forming a lithium negative electrode on the first electrolyte membrane prepared in step (d); and
   (f) forming an air electrode on the second electrolyte membrane prepared in step (d),
   wherein the lithium ion conductive inorganic electrolyte and the polymer electrolyte are mixed in a weight ratio of about 80 to 90:10 to 20 to prepare the first electrolyte membrane,
   wherein the pore-forming additive is dibutylphthalate, and
   wherein an amount of about 5 to 10 wt % of the pore-forming additive is mixed with respect to the total weight combining the lithium ion conductive inorganic electrolyte and the polymer electrolyte.

2. The method of claim 1, wherein the lithium ion conductive inorganic electrolyte is at least one selected from the group consisting of oxide, phosphate, sulfide, and LiPON-based inorganic materials.

3. The method of claim 1, wherein the first electrolyte membrane comprises pores having an average pore size of about 0.01 to 10 μm and porosity of about 20 to 30%.

4. The method of claim 1, wherein the first electrolyte membrane has a thickness of about 20 to 80 μm and the second electrolyte membrane has a thickness of about 200 to 300 μm.

5. The method of claim 1, wherein the second electrolyte membrane is at least one kind selected from the group consisting of a glass fiber, an olefin-based resin, a fluorine-based resin, an ester-based resin, and a cellulose-based non-woven fabric.

* * * * *